United States Patent [19]

Hennessy

[11] Patent Number: 4,648,613
[45] Date of Patent: Mar. 10, 1987

[54] SAFETY DESIGN NEWSPAPER INSERT CART

[75] Inventor: James J. Hennessy, Chambersburg, Pa.

[73] Assignee: Hennessy Products, Inc., Chambersburg, Pa.

[21] Appl. No.: 755,920

[22] Filed: Jul. 17, 1985

[51] Int. Cl.⁴ .............................................. B62B 5/04
[52] U.S. Cl. .............................. 280/79.1 A; 74/99 A; 74/107; 188/5; 188/72.7
[58] Field of Search ...................... 280/79.1 R, 79.1 A, 280/79.2, 79.3; 188/5, 7, 166, 72.7; 74/99 R, 99 A, 104, 107; 192/89 A, 93 A, 95

[56] References Cited

U.S. PATENT DOCUMENTS 2,333,450  11/1943  Staley ................................. 188/5 X
4,302,025  11/1981  Waddell et al. .................... 280/79.3

FOREIGN PATENT DOCUMENTS 719186  11/1954  United Kingdom .................... 188/5

Primary Examiner—John J. Love
Assistant Examiner—Eric D. Culbreth
Attorney, Agent, or Firm—Daniel J. O'Connor

[57] ABSTRACT

A newspaper insert cart including a braking assembly which allows the cart to be stopped and rotated for convenient unloading of various sections. The braking assembly structure is specially designed for reliability, durability and a positive braking action. It also results in an overall system which is much less likely to cause injury to the cart user than systems heretofore known in the prior art.

1 Claim, 4 Drawing Figures

SAFETY DESIGN NEWSPAPER INSERT CART

BACKGROUND OF THE INVENTION

As used in the present invention description, the term insert refers to those advertising or informational newspaper inserts which are added to a daily or Sunday newspaper.

As is known in the industry, such inserts are commonly preprinted in a separate printing run days or weeks ahead of the normal daily newspaper. Since the daily newspaper itself leaves the printing presses in a folded condition, it then becomes necessary to place the advertising inserts inside the folded newspapers.

Such melding of the advertising insert with the folded newspaper must be accomplished rapidly due to the exigencies of daily newspaper delivery.

Accordingly, specialized insert machines have been developed in the art to accomplish the above. Typically, in a mechanized operation, the advertising inserts are loaded into a hopper of an insert machine which automatically places the inserts into the appropriate position in the printed daily newspaper.

It has been known in the industry for a number of years to utilize sectioned carts to transport the advertising inserts to the hopper of an insert machine. For example, the use of carts having four different insert carrying sections have been used in the art, such carts in past years typically being made of wood.

Loading carts of this variety have become known as insert carts, and such are the subject of the present invention.

The four-sectioned structure of the wooden insert carts has been utilized to accomplish a more rapid loading of the advertising inserts into the hopper of an insert machine. Of course, such wooden carts had rolling casters mounted therebelow for transport of the advertising inserts from one place in the printing plant to the desired hopper location.

In more recent years, the insert carts have been fashioned of metal and ways have been developed to facilitate the more rapid loading and unloading of such insert carts.

An example of a prior art metal insert cart is shown in U.S. Pat. No. 4,302,025 to Waddell et al. As shown in FIG. 1 of the U.S. Pat. No. 4,302,025 to Waddell, metal insert carts of today's usage continue to utilize the four-sectioned structure known in the older prior art wooden insert cart designs.

The Waddell '025 structure also incorporated a rod 62 and pad 54 braking structure, shown in FIG. 2 of the patent, which operates as follows: an exterior handle 84 is moved from a horizontal position by the operator to the vertical position shown in FIG. 2. Such movement of the handle 84 serves to force rod 62 and attached lower pad 54 downward into a braking position whereby the loaded insert cart can be rotated about a fixed point on casters 16 so that a workman can easily unload the four sections of the cart and appropriately place the advertising inserts into the hopper of an insert machine.

It has been realized in the safety engineering arts that structures such as those of the Waddell patent may pose a serious cart operator safety hazard in practical use.

For example, the braking handle 84 of the Waddell system may be operated by one hand only of the cart using operator, leaving the other hand free to be potentially caught under the section shown as 88 in FIG. 2 of the '025 patent. Such potential for operator injury has been generally recognized by national safety engineering groups and the U.S. Occupational Safety and Health Administration (OSHA) in promulgating standards which recommend that a manually actuated machine be designed such that both hands of a workman are required in the activation step to eliminate the possibility for crushing or severing injury to a free hand which may be placed in the work area.

Other potentially dangerous aspects of configurations such as that of Waddell have been noted by those of skill in the art. For example, in the brake-on position of Waddell, the relatively sharp handle 84 is in a vertical position which may cause injury to a workman falling or slipping in the area of the insert cart. Further, as the handle 84 is turned up or down by the workman, it passes through region 74 and tends to very rapidly accelerate or snap into the up or down position. Such rapid handle acceleration also poses a risk of injury to the using workman.

In an age of profuse product liability litigation, it is of course recognized that the elimination of safety hazards wherever possible is of tantamount importance in the arts. Such is especially true where, as here, the working tool is intended for use by unskilled or semi-skilled personnel.

OBJECTS OF THE INVENTION

Accordingly, it is an object of the present invention to provide an insert cart having a brake to allow rotation of the cart to facilitate the rapid unloading of the cart as required in the newspaper industry.

It is a further object of the invention to provide a more positive braking function and added reliability and durability for an insert cart than has heretofore been utilized in the arts.

It is also an important object of the present invention to provide an insert cart having features incorporated into the combination structure and the cart braking assembly which result in maximizing worker safety and which minimize the potential for worker injury in using the device.

Further objects and advantages of the present invention will become apparent as the following description proceeds, and the features of novelty characterizing the invention will be pointed out with particularity in the claims annexed to and forming a part of this specification.

BRIEF SUMMARY OF THE INVENTION

The invention utilizes an upper brake operating handle which normally requires the use of both hands by an operating workman. An elongated rod extends downwardly from the handle to serve as a floor-contacting brake mechanism. A pin and slot camming arrangement is positioned in an area of the device where it does not pose a threat of injury to work personnel.

The pin referred to is securely affixed to the elongated braking rod in a manner to provide for a more positive braking action and less possibility of pin breakage.

The camming slot referred to is part of a subassembly which has an upper plate thereon serving to confine all potentially hazardous areas of the device from the cart operator.

DESCRIPTION OF THE PREFERRED EMBODIMENT

Figure 1:
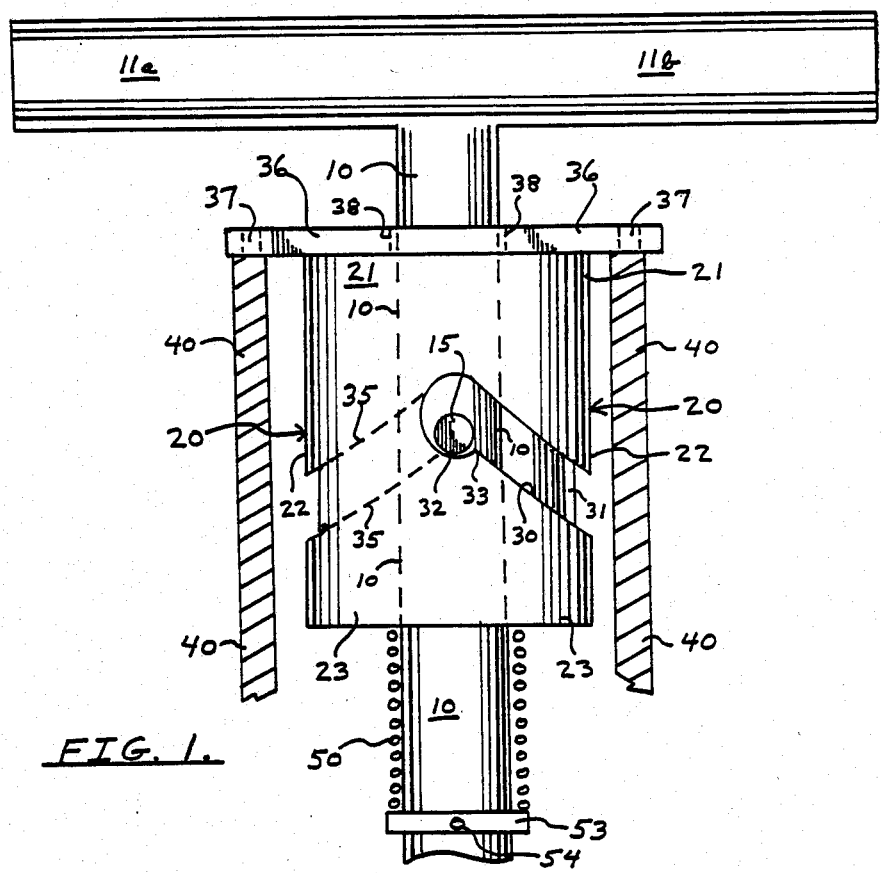
FIG. 1 is an enlarged side elevational view of the upper portion of the insert cart and braking assembly of the invention.

Referring now to the drawings in which like numerals refer to like component parts, FIG. 1 shows in side elevational view the important operational components of the insert cart and braking assembly of the present invention.

A one piece clamping rod 10 has a cross-handle welded to the top thereof as indicated at 11a and 11b. Clamping rod 10 extends downwardly through a clamping cam subassembly 20 and, at its lower end shown in FIG. 2, rod 10 extends through an opening 61 in the insert cart base 60. As shown, the rod 10 at its lower portion is not in contact with floor 5 thus being in the brake-off position.

In the basic operation of the device, upper portions 11a and 11b are grasped by the operator and turned counterclockwise. Rod 10 is driven downward by the action of floating compression spring 50 on the spring collar 53 and the lower portion of rod 10 thus contacts floor 5 where the insert cart is braked from further translational movement. It is to be understood that in the brake-on position, the cart can pivot about the point created by rod 10 and ground 5 by way of conventional roller casters 62.

Figure 3:
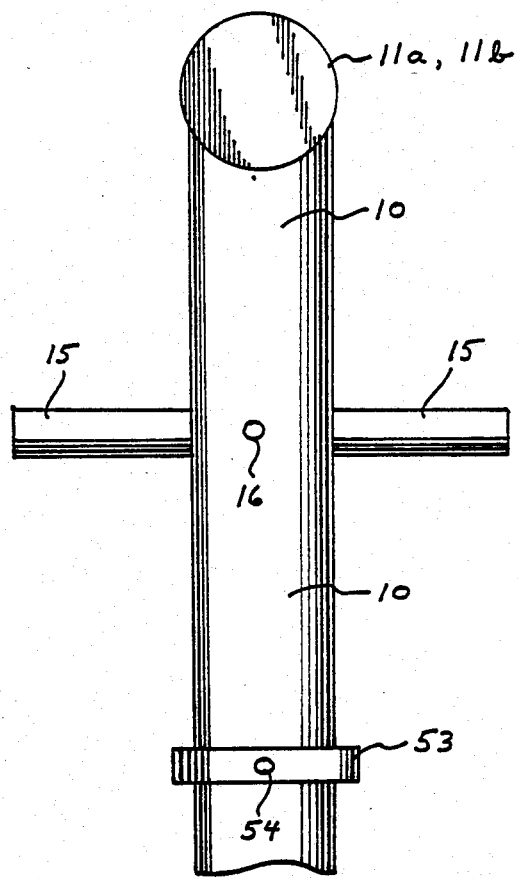
FIG. 3 is an elevational view of the clamping rod subassembly showing the pivot pin and spring collar attached thereto.

As shown in FIG. 3, the clamping rod 10 has two components rigidly attached thereto. The first attached component is a pivot pin 15 which passes through clamping rod 10 and is attached rigidly to it by means of set screws indicated at 16. The second component rigidly attached to the clamping rod 10 is a spring collar 53 mounted by means of pin 54. The purpose and function of both components will be more fully described hereinbelow.

Referring again to FIG. 1, it can be understood that, as handles 11a and 11b are grasped and turned counterclockwise, pivot pin 15 follows the downwardly angled path formed by slot 30 which has been formed in the clamping cam assembly 20. It is to be understood that a groove 32 and lip 33 construction is formed on the upper portion of slot 30 so that, once the pin 15 slides over lip 33, the compression spring 50 strongly urges collar 53 and therefore the attached rod 10 downwardly into a braking position with floor 5.

Pin 15 thus follows the path of slot 30 until it contacts a lower vertical wall 31 of the slot 30 where the pin 15 and its attached rod 10 are stopped from further movement.

It is to be understood that slot 30 extends for a distance of approximately ninety degrees around the circumference of clamping cam 20. It is contemplated that, in practice of the invention, the slope of slot 30 would be in the range of 25-55 degrees as measured from a horizontal plane.

It should also be understood that a second slot 35 would be formed on the other side of clamping cam 20. This second slot is indicated by dashed lines in FIG. 1 and would be identical to slot 30 and receive the second end of pivot pin 15, shown in FIG. 3, thus providing a more positive and durable clamping cam action.

In viewing FIG. 1, it can be seen that the clamping cam subassembly 20 has three sections or zones as a part thereof. A middle zone 22 has the slots 30 and 35 formed therein, said slots serving to guide the ends of pin 15 along the desired path and thereby permit compression spring 50 to force rod 10 into its downward or brake-on position. A lower reduced area zone 23 of the clamping cam subassembly 20 serves as a guide for rod 10 during its upward and downward operating motions. Zone 23 by its reduced area also serves as an abutting surface for spring 50.

An upper zone 21 serves as a mounting section for the clamping cam cover plate 36. In practice of the invention, cover plate 36 is welded to upper zone 21.

The clamping cam cover plate 36 is of importance to the overall invention since it serves in part to isolate the camming area from the operator of the cart, thus serving to reduce the likelihood of injury.

Cover plate 36 has an aperture 38 in a central portion thereof to allow passage and upward and downward motion of rod 10. Cover plate 36 also has four apertures 37 at its corners whereby the cover plate and the entire clamping cam subassembly 20 may be bolted or otherwise fixedly attached to the upper ends of four vertical sectional dividers 40, said dividers 40 serving to provide four compartments for loading of newspaper inserts into the cart. Two of the vertical dividers 40 are shown schematically in FIG. 1 and the location of all four vertical dividers is shown in the top plan view of FIG. 4. The four apertures 37 are also shown in the plan view of FIG. 4.

Figure 4:
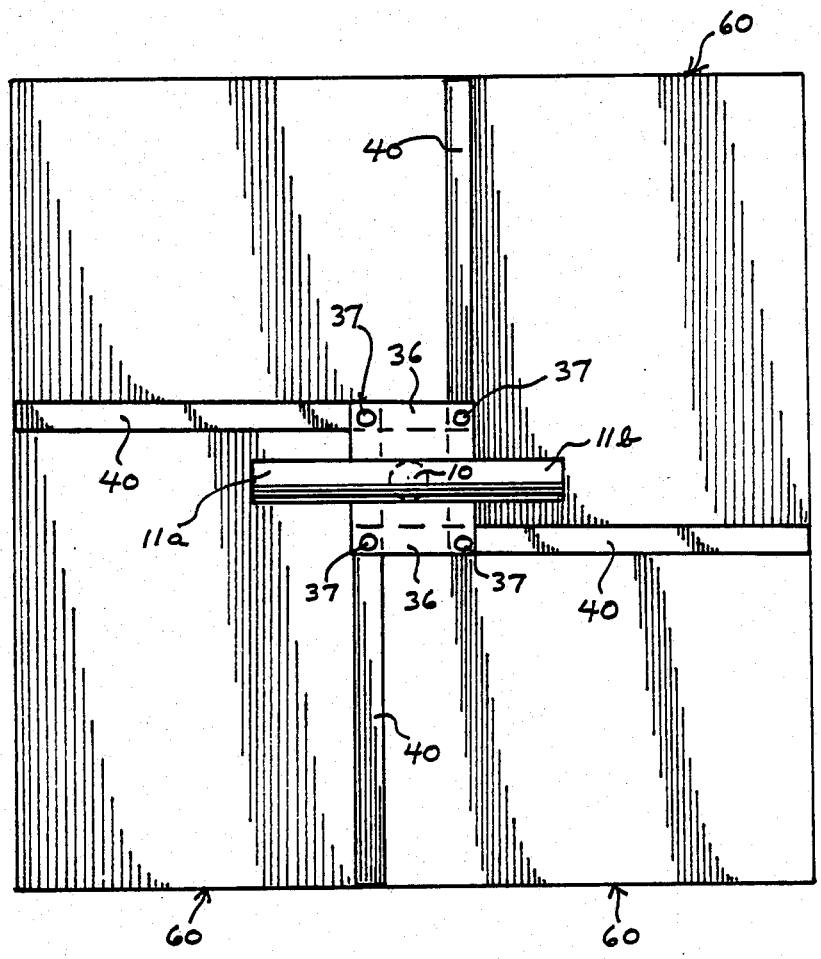
FIG. 4 is a top plan view of the overall device.

As can be seen in the views of FIGS. 1 and 4, the vertical dividers 40 in combination with the bolted clamping cam cover plate 36 serve to completely isolate the clamping cam subassembly 20 and the moving pin 15 therein.

Such isolation of the camming assembly results in a system which is much less likely to result in injury to a person utilizing the cart for the simple reason that the operator's hands, hair or loose clothing cannot be caught in the camming mechanism.

Figure 2:
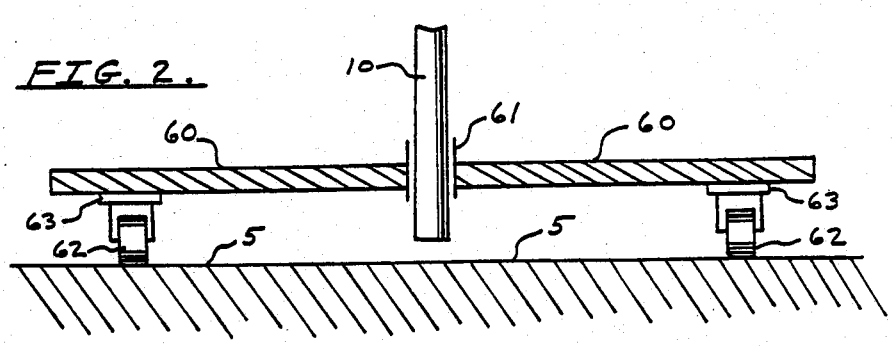
FIG. 2 is a reduced side elevational view of the lower portion of the insert cart showing the clamping rod 10 in the brake-off position.

To recapitulate the operation of the insert cart of the present invention, a cart loaded with newspaper inserts would be pushed to the desired work area with the clamping rod 10 in the brake-off position shown in FIGS. 1 and 2 i.e. pin 15 is resting in the groove 32 formed in slot 30 and also in slot 35. Upon reaching the desired point, handles 11a and 11b are grasped by the workman and turned counterclockwise thus slipping the pivot pin 15 ends over lips 33. Spring 50, which is always under compression, then acts to force rod 10 downward into its floor 5 contacting brake-on position.

As rod 10 is forced downward, ends of pin 15 move downwardly along slots 30 and 35 until said pin ends contact the lower slot walls as indicated at numeral 31, thus stopping the downward motion of rod 10.

In the brake-on position, with rod 10 in contact with floor 5, the cart is braked from translational movement (for example, a rubber tip may be used on the end of rod 10) while still allowing cart rotational movement via casters 62 as desired by the person unloading the insert cart.

From the foregoing, it can be realized by those of skill in the art that a reliable and durable, positive acting combined insert cart and brake assembly has been set forth by the applicant herein. The overall system also incorporates important safety features which greatly reduce the possibilities of injury and resultant products liability suits for users and manufactures of the device.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

I claim:

1. A newspaper advertising insert cart having enhanced safety features incorporated therein, said insert cart comprising:
    a base member (60),
    a plurality of roller caster members (62) on a lower portion of said base member (60),
    an aperture (61) extending through said base member (60),
    an elongated one-piece rod (10) extending through said aperture (61) at a lower portion of said one-piece rod,
    an upper end of said one-piece rod (10) having cross-handle means (11a, 11b) affixed thereto,
    said one-piece rod (10) having a pivot pin (15) mounted thereto at a portion of said rod between said cross-handle means and said rod lower portion, said pivot pin (15) extending outwardly from both sides of said rod (10) and capable of assuming an upper or brake-off position and a lower or brake on position,
    a spring collar means (53) fixedly mounted to said one-piece rod (10) at a position thereon below said pivot pin (15),
    a clamping cam assembly (20) having at least a middle zone (22) thereon, said middle zone (22) having sloped slot means (30,35) thereon for receipt of the ends of said pivot pin (15),
    said clamping cam assembly (20) having a lower zone (23) thereon comprising a reduced area for guidance of said rod (10) extending therethrough,
    spring means (50) mounted around said rod (10) and between said lower zone (23) of said clamping cam assembly (20) and the spring collar means (53),
    said clamping cam assembly (20) further comprising an upper zone (21) above said middle zone (22), said upper zone (21) having affixed thereto a cover plate means (36) for prevention of injury to the insert cart user,
    vertical means (40) extending between said base member (60) and said cover plate means (36),
    means (37) for affixing said cover plate means (36) to said vertical means (40) whereby said clamping cam assembly (20) is entirely isolated for protection of a workman using the insert cart,
    wherein said sloped slot means (30,35) in said middle zone (22) comprises two slots each extending for approximately ninety degrees around the circumference of said clamping cam assembly (20),
    wherein each of said slots (30,35) has a lower wall portion means (31) for stopping the traverse of said pin (15) relative to the clamping cam (20) and wherein
    each of said slots (30, 35) has a groove (32) formed in an upper portion thereof by reason of an extending lip means (33),
    said groove and lip structure means serving to hold pin (15) in the upper or brake-off position,
    wherein said vertical means (40) comprise four sectional divider elements for providing four sections or areas for loading newspaper inserts onto the insert cart,
    wherein said spring means (50) is a compression spring and serves to force collar (53) and thereby rod (10) downwardly when pin (15) is disengaged from groove (32) in slot (30) by rotation of said crosshandle means (11a, 11b),
    wherein said cover plate means (36) has aperture means (38) formed therein for passage of rod (10) therethrough.

* * * * *